UNITED STATES PATENT OFFICE.

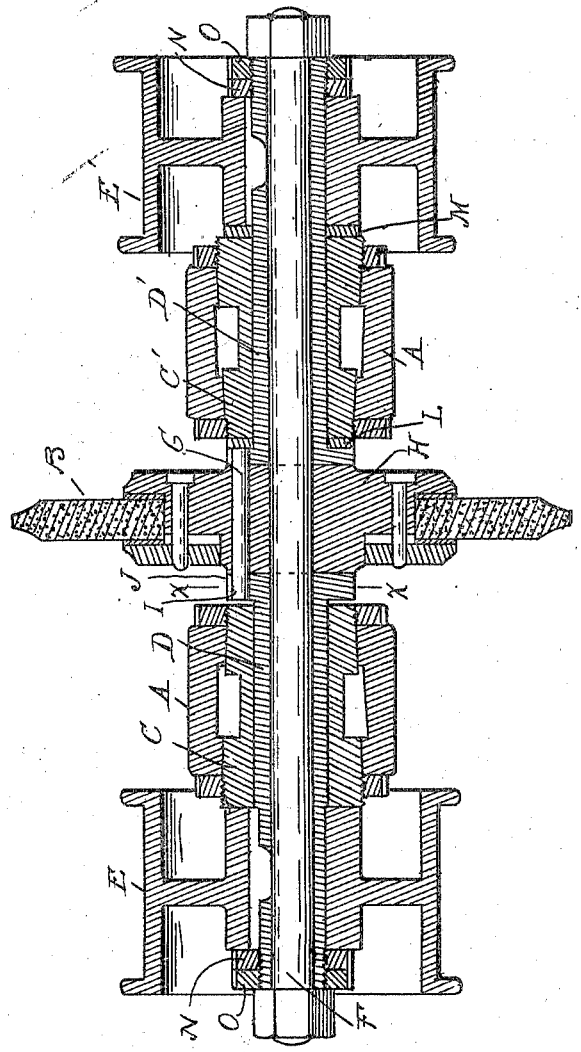
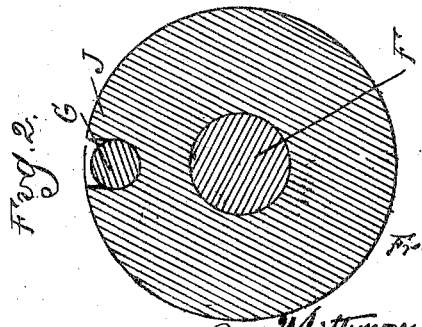

FREDERICK A. WARD, OF DETROIT, MICHIGAN, ASSIGNOR TO GEAR GRINDING MACHINE COMPANY, OF DETROIT, MICHIGAN, A CORPORATION OF MICHIGAN.

GRINDER.

965,773.  Specification of Letters Patent.  Patented July 26, 1910.

Application filed August 2, 1909. Serial No. 510,696.

*To all whom it may concern:*

Be it known that I, FREDERICK A. WARD, a citizen of the United States of America, residing at Detroit, in the county of Wayne and State of Michigan, have invented certain new and useful Improvements in Grinders, of which the following is a specification, reference being had therein to the accompanying drawings.

The invention relates to grinding machines more particularly designed for use in the grinding of gears, and it is the object of the invention to provide means for quickly and easily exchanging the grinders, and at the same time for accurately positioning said grinders while in work to rotate in a constant plane.

To this end, the invention consists in the construction as hereinafter set forth.

In the drawings—Figure 1 is a longitudinal section in the plane of the grinder arbor; and Fig. 2 is a cross section thereof, on line X—X.

For certain classes of work—such as for gear grinding—it is necessary that the grinder wheel should be positioned with great accuracy; and it is also necessary to frequently exchange the wheels to suit the requirements of the work. With the present invention, I have accomplished the desired result by the following construction: A is the frame, which carries the grinder wheel B, and C C' are bearings for the grinder arbor secured to said frame upon opposite sides of the wheel. The arbor, to which the wheel is secured, is formed in two tubular sections D D', which are respectively journaled in bearings C C' and extend beyond the same for engagement with the drive pulleys E E'. In addition to the tubular sections D D', a shaft F of uniform diameter extends through said tubes and the grinder wheel.

With the construction as thus far described, it will be understood that to mount and dismount the grinder wheels, it is only necessary to remove the shaft F, without disturbing the tubular arbors D D' or the drive pulleys E E'. It is, however, necessary to key or otherwise secure the grinder wheel to rotate with the arbors, and this is accomplished by a pin G, which engages a bore in the hub H of the wheel, and has projecting ends which engage with the recesses I in the flange J on the arbor sections D D'. The flanges J also form clamps for the hub H which are drawn together by providing end bearings for one of the arbor sections, which are adjustable to take up all wear or lost motion. These, as shown, consist of washers L and M, upon opposite ends of the journal C', the washer L being arranged between the flange J and said bearing, and the washer M between the bearing and the hub of the drive pulleys E'. Adjustment is effected by the nut N on a threaded end of the arbor section D', while the lock nut O holds the nut N from change of position. At the opposite end, similar lock nuts N' and O' are provided for taking up lost motion between the hub of the pulley and the bearing but the washers L and M are omitted. Thus the wheel will be positioned with relation to the bearing C' and sufficient clearance is provided between the flange J and the bearing E to permit of relieving all clamping stress upon the hub H when the wheel is to be removed.

What I claim as my invention is:

1. The combination with a grinder wheel, of bearings upon opposite sides thereof, tubular arbor sections journaled in said bearings and spaced to receive the wheel, and a central shaft insertible through said tubular arbors and the hub of the wheel.

2. The combination with a grinder wheel, of journal bearings upon opposite sides of said wheel, tubular arbor sections journaled in said bearings and spaced for the insertion of the wheel therebetween, a shaft insertible through said tubular arbor sections and the hub of the wheel, and means for clamping said shaft and arbor sections together.

3. The combination with a grinder wheel, of journal bearings upon opposite sides of said wheel, tubular arbor sections journaled in said bearings and spaced to receive the wheel therebetween, a key carried by said wheel engaging recesses in said arbor sections, and a shaft insertible through said arbor sections and the hub of the wheel.

4. The combination with a grinder wheel, of journal bearings on opposite sides of said wheel, tubular arbor sections journaled in said bearings and provided with flanges on their inner ends spaced from each other to receive the hub of the wheel therebetween, a shaft insertible through said arbor sections and the hub of the wheel, and a nut engaging a threaded end of the shaft for clamping the flanges of said arbor sections against the hub of the wheel.

5. The combination with a grinder wheel, of journal bearings on opposite sides of said wheel, tubular arbor sections journaled in said bearings and extending beyond the same, drive pulleys mounted on the extensions of said arbor sections, a hub for the wheel insertible between the inner ends of said arbor sections, a key carried by said hub laterally engageable with said arbor sections, and a shaft insertible through said arbor sections and the hub of said wheel for securing the parts in operative relation.

6. The combination with a grinder wheel, of journal bearings on opposite sides of said wheel, tubular arbor sections journaled in said bearings and extending beyond the same, end bearings for one of said arbor sections engaging the journal bearing therefor, a shaft insertible through said arbor sections and the hub of the grinder wheel, and means for clamping said shaft and opposite arbor section to said arbor section having the end bearings.

7. The combination with a pair of permanently positioned drive pulleys, of a grinder wheel detachably mounted intermediate said pulleys and driven thereby.

8. The combination with a pair of permanently positioned drive pulleys, of a grinder wheel intermediate said pulleys, and a shaft on which said wheel is mounted, detachably engaging said pulleys.

9. The combination with a pair of permanently journaled drive pulleys, of an arbor driven by said pulleys, a grinder wheel, and means to mount said wheel detachably on said arbor, the wheel being removable from the latter without affecting the positions of said pulleys.

10. The combination with a pair of drive pulleys, of arbor sections driven by the respective pulleys, and a grinder wheel interposed between said arbor sections and driven thereby.

11. The combination of driving pulleys arranged side by side, arbor sections driven by the respective pulleys and extending toward each other, and a grinder wheel interposed between said sections.

In testimony whereof I affix my signature in presence of two witnesses.

FREDERICK A. WARD.

Witnesses:
W. J. BELKNAP,
HARRY W. GRAHAM.